United States Patent [19]

Ishida et al.

[11] Patent Number: 4,737,015

[45] Date of Patent: Apr. 12, 1988

[54] OPTICAL WAVEGUIDE HAVING A SILICON OXI-NITRIDE LAYER

[75] Inventors: Koji Ishida, Musashino; Hiroyoshi Matsumura, Iruma; Kenji Hiruma, Kokubunji; Kazuyuki Nagatsuma, Hachioji; Akihito Hongo, Hitachi, all of Japan

[73] Assignee: Hitachi, Ltd. Hitachi Cabel, Tokyo, Japan

[21] Appl. No.: 674,770

[22] Filed: Nov. 26, 1984

[30] Foreign Application Priority Data

Nov. 28, 1983 [JP] Japan ................... 58-222074

[51] Int. Cl.⁴ ............................... G02B 6/00
[52] U.S. Cl. ................... 350/96.34; 350/96.12
[58] Field of Search ............. 350/96.1, 96.12, 96.29, 350/96.34; 357/52, 54

[56] References Cited

U.S. PATENT DOCUMENTS

| | | | |
|---|---|---|---|
| 3,962,062 | 6/1976 | Ingrey | 350/96.12 X |
| 4,065,730 | 12/1977 | Mindem | 350/96.12 X |
| 4,319,803 | 3/1982 | Burmeister et al. | 350/96.34 X |
| 4,367,916 | 1/1983 | Mottier et al. | 350/96.12 |
| 4,402,720 | 9/1983 | Edahiro et al. | 350/96.34 X |

OTHER PUBLICATIONS

Brown et al., *J. Electrochem. Soc.*, Mar. 1968, "Properties of $Si_xO_yN_z$ Films on Si," vol. 115, No. 3, pp. 311–317.

Rand et al., *Applied Optics*, 11(11), Nov. 1972, "Silicon Oxynitride Films on Fused Silica for Optical Waveguides," pp. 2482–2488.

Stutius et al., *Applied Optics*, 16(12), Dec. 1977, "Silicon Nitride Films on Silicon for Optical Waveguides," pp. 3218–3222.

*Primary Examiner*—William L. Sikes
*Assistant Examiner*—Frank González
*Attorney, Agent, or Firm*—Antonelli, Terry & Wands

[57] ABSTRACT

An optical waveguide comprising a layer formed on a substrate, having a mixed composition of silicon oxide and silicon nitride and having an arbitrary value of refractive index ranging between those of the silicon oxide and the silicon nitride. The layer of said mixed composition can be formed on the substrate to easily fabricate the optical waveguide of the present invention by conducting a sputtering method employing a Si target and controlling the composition of a sputtering gas composed of a mixture of $N_2$ and $O_2$ gases.

17 Claims, 2 Drawing Sheets

OPTICAL WAVEGUIDE HAVING A SILICON OXI-NITRIDE LAYER

BACKGROUND OF THE INVENTION

The present invention relates to an optical waveguide which is required of an optical integrated circuit to be used in an optical communication or optical processing field and to a process for fabricating the optical waveguide.

The optical waveguide is constructed of a core, which is overlaid on a substrate material for optical waveguidance, and a clad having a lower refractive index than that of the core portion. No matter what construction the optical waveguide might have, therefore, there are required two or more kinds of transparent materials of different refractive indexes, both or all of which have to be thin films. Moreover, the differences in the refractive index between or among those transparent materials is within 5 to 6% at most in most cases. As the materials for the optical waveguide, a number of materials such as semiconductors, ferroelectrics, glass or organic substances are reported in the prior art, and a coxbination of the materials having a suitable difference in refractive indexes is selected in accordance with this object. However, the actually applicable combination of the thin film materials is seriously restricted consideration is given to the construction, the difference in the refractive index between or among the respective portions and the fabricating process of the optical waveguide. In other words, the design of the optical waveguide is seriously restricted by the restriction on the materials, and free design of the optical waveguide is difficult.

The following references are cited to show the state of the art: (i) J. E. Goell, Applied Optics, vol. 12 (1973), page 737; (ii) T. Izawa et al, Applied Physics Letter, vol. 38 (1981), page 483; and (iii) D. H. Hensler et al, Applied Optics, vol. 10 (1971), page 1037.

SUMMARY OF THE INVENTION

An object of the present invention is to provide an optical waveguide having a construction which eliminates the difficulties in the prior art to greatly increase the degree of designing freedom and, more particularly, to provide an optical waveguide having such a construction as has been difficult to realize by the materials and the fabrication processes of the prior art, and a fabrication process for fabricating the above-specified optical waveguide without difficulty.

In order to achieve the object, the waveguide of the present invention uses a transparent optical material which is prepared by the same sputtering method and apparatus, except for the change in the composition of the sputtering gas which can control a refractive index to a desired value over a wide range, as at least a portion of the core and/or a portion of the clad. Specifically, by using silicon as a target, by composing the sputtering gas of a mixed gas of $N_2$ and $O_2$, and by conducting the sputtering by controlling the gas composition, a layer (which will be referred to as an "oxi-nitride layer"), which has a suitable value of refractive index between those of a silicon oxide ($SiO_2$) layer and a silicon nitride ($Si_3N_4$) layer and which is made of a mixture of silicon oxide and silicon nitride, is formed on a substrate to provide a thin film type optical waveguide.

In the case of a wavelength of 0.633 μm, a quartz glass ($SiO_2$) layer has a refractive index of 1.458, and a silicon nitride ($Si_3N_4$) layer has a refractive index of 2.23. As a result, the oxi-nitride layer to be used in the optical waveguide of the present invention has a suitable value of refractive index ranging of 1.458 to 2.23 for the wavelength of 0.633 μm.

Incidentally, the sputtering condition of the oxi-nitride layer in case the optical waveguide of the present invention is to be fabricated is sufficient, if the sputtering gas is a mixed gas of $O_2$ and $N_2$ for a desired value of the refractive index of the oxi-nitride layer fabricated and if the well-known reactive sputtering condition in case the $SiO_2$ and $Si_3N_4$ layers are to be prepared is used. On the other hand, the substrate forming a part of the optical waveguide may be that used in the prior art.

The substrate will now be further described with reference to FIG. 1 (which will be described in more detail in connection with a later-described Embodiment 1). The substrate to be covered with the oxi-nitride layer may be either of: (i) an intrinsic substrate 10 with neither a clad layer nor an optical waveguide layer; (ii) one having a lower clad layer in advance on the surface of the intrinsic substrate 10; and (iii) one having both the lower clad layer 11 and an optical waveguide layer 12 in advance on the intrinsic substrate 10, and all of the above-specified structures (i), (ii) and (iii) will be referred to herein as the "substrate". In the case of the structure (i), the lower clad layer 11, the optical waveguide layer 12 and an upper clad layer 13 are formed on the surface of the substrate 10 by an ox-initride layer; in the case of the structure (ii), the optical waveguide layer 12 and the upper clad layer 13 are formed on the lower clad layer 11 existing in advance on the substrate by the oxi-nitride layer; and, in the case of the structure (iii), the upper clad layer 13 is formed on the optical waveguide layer 12, which exists in advance on the optical waveguide layer of the substrate additionally having the lower clad layer 11, by the oxi-nitride layer.

DESCRIPTION OF THE PREFERRED EMBODIMENTS

Figure 1:
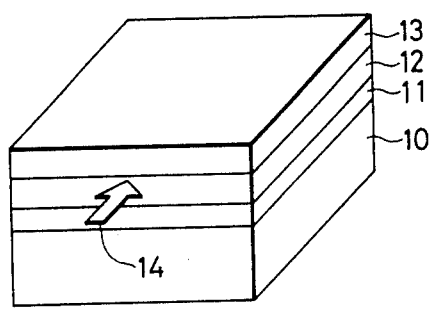
FIG. 1 is a schematic perspective view showing an optical waveguide according to an embodiment of the present invention.

First of all, the relationship, which is a subject common among the following respective embodiments, between the composition of the sputtering gas and the refractive index of the oxi-nitride layer obtained will be explained on the basis of the experimental results.

By employing polycrystalline silicon as a target, the oxi-nitride film was formed on a glass substrate, under the following conditions:

RF power: 500 W; and
Sputtering pressure: 5 Pa.

The composition of the sputtering gas is dictated by a flow ratio of $F_{O2}/(F_{O2}+F_{N2})$, the reference characters $F_{O2}$ and $F_{N2}$ indicating the flow rates of $O_2$ and $N_2$, respectively. In the present experiments, the flow ratios were of seven kinds ranging from 0 to 1. The total flow rate was set at 30 cc/min. The substrate was not heated especially.

Figure 2:
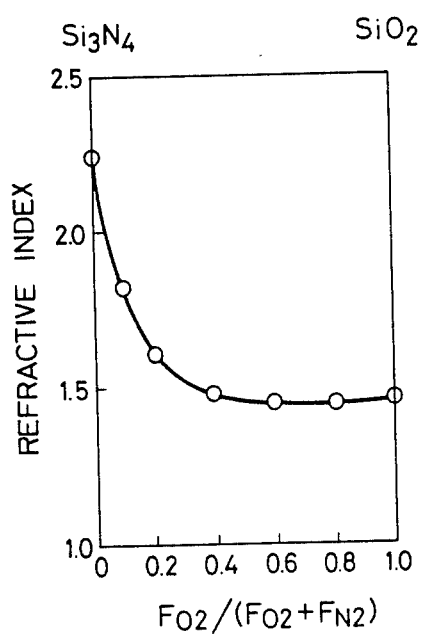
FIG. 2 is a graph depicting the relationship between the composition of a sputtering atmosphere and the refractive index of the oxi-nitride layer obtained.

Thus, seven kinds of samples were prepared by varying the composition of the sputtering gas, and their spectral transmitting characteristics were measured. By the well-known refractive index measuring method using the interference between the beam reflected from the layer surface and the reflected beam having passed through the layer, the refractive indexes of the oxide layer, the oxi-nitride layer and the nitride layer (three of which will be referred altogether to an "oxi-nitride film") for the respective wavelengths were determined from the locations of the maximum and minimum of transmissivity and from the layer thickness. FIG. 2 plots the refractive index of the oxi-nitride film for the wavelength of 0.633 μm by a He-Ne laser against the composition of the sputtering gas when said film is formed.

As shown in FIG. 2, the refractive index of the oxi-nitride layer formed by the sputtering varies continuously from 2.23 to 1.458. Reflected from the fact that the activity of the $O_2$ gas is higher than that of the $N_2$, the refractive index is abruptly dropped by the introduction of a small quantity of the $O_2$. The foregoing results imply that the oxi-nitride layer having an arbitrary refractive index between those of the $SiO_2$ glass and the $Si_3N_4$ can be fabricated by a single method and a single apparatus by selecting the ratio of the $N_2$ and $O_2$ gases in the sputtering atmosphere.

EXAMPLE 1

By reactive sputtering employing the Si as a target and using the mixed gas of $N_2$ and $O_2$ as the atmosphere, the three oxi-nitride layers 11, 12 and 13, which had their refractive indexes controlled by adjusting the atmosphere from the relationship determined from FIG. 2, were prepared consecutively on the quartz substrate 10, as shown in FIG. 1. The measured values of the refractive indexes and thicknesses of the respective sputtered layers 11 12 and 13 are, as follows, and the sputtering conditions were the same as the aforespecified ones:

| Sputtered Layer | Refractive Index | Thickness (μm) | Flow Ratio ($F_{O2}/F_{O2} + F_{N2}$) |
|---|---|---|---|
| 11 | 1.65 | 0.8 | 0.17 |
| 12 | 1.72 | 1.2 | 0.15 |
| 13 | 1.69 | 1.0 | 0.16 |

The He-Ne laser beam was introduced in the direction of arrow 14 through an objective lens having a magnification of 20 times into the flat optical waveguide thus fabricated, and the transmission loss measured of the light guided through the optical waveguide layer 12 was at a value as low as about 1.6 dB/cm. The results thus far described reveal that the oxi-nitride layers prepared by the sputtering method were sufficiently transparent as the materials for the optical waveguide.

Incidentally, the oxi-nitride layers 11, 12 and 13 provide the lower clad layer, the optical waveguide layer and the upper clad layer, respectively.

EXAMPLE 2

Figure 3:
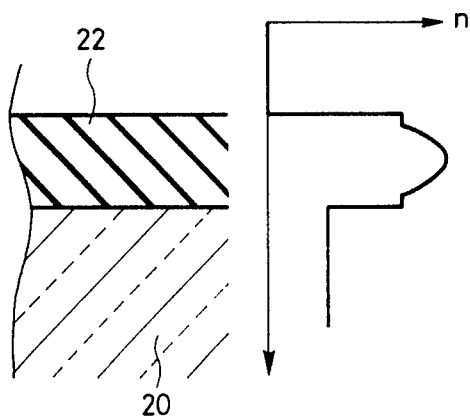
FIG. 3 is a schematic section showing the optical waveguide according to another embodiment of the present invention and a diagram depicting the distribution of the refractive index of the same optical waveguide.

As shown in sectional view at the lefthand side of FIG. 3, an oxi-nitride layer having a thickness of 3 μm to provide an optical waveguide 22 was formed on a quartz glass substrate 20 by employing a Si target and by using the mixed gas of $O_2$ and $N_2$ as the sputtering gas, as has been described hereinbefore. Then, the optical waveguide 22 having a graded type refractive index distribution that is vertically symmetric in the direction of thickness, as shown in the refractive index distribution diagram at the righthand side of FIG. 3, was fabricated by varying the mixture ratio of the $O_2$ gas and the $N_2$ with the lapse of time. The optical waveguide thus having the graded type refractive index distribution symmetric in the direction of thickness has been nearly impossible to fabricate by the diffusion method or the ion implantation method of the prior art, but can be easily fabricated merely by varying the composition of the sputtering gas with time. Although the optical waveguide is exemplified here by the graded type, the optical waveguide having any distribution of the refractive index in the direction of thickness can be easily fabricated according to the present invention merely by varying the sputtering gas composition with time.

In the present example, incidentally, the oxi-nitride layer had a refractive index of 1.50 at the maximum and 1.47 at the minimum, and its upper and lower portions corresponding to the clad layers and having a constant refractive index respectively had a thickness of 0.5 μm.

EXAMPLE 3

Figure 4:
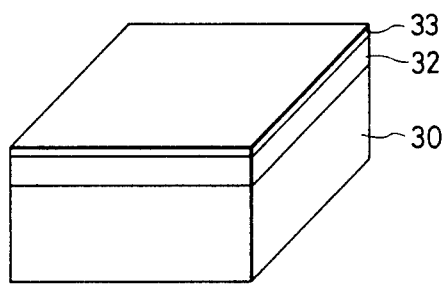
FIG. 4 is a schematic perspective view showing an optical waveguide according to still another embodiment of the present invention.

In the present example, a single mode $LiNbO_3$, which had such a thick optical waveguide layer that could have been difficult to fabricate in the prior art, was easily fabricated by forming an oxi-nitride layer on the optical waveguide layer which had been prepared by diffusing Ti in the surface of a $LiNbO_3$ substrate. The optical waveguide according to the present example will be described in the following with reference to FIG. 4.

Titanium (Ti) was deposited to have a thickness of 300 Å A on a Y-cut $LiNbO_3$ 30 having a thickness of 400 μm and subjected to a heat treatment at 1,080° C. for six hours so that the Ti was diffused into the LiNbO$_3$ to form an optical waveguide layer 32 thereby to fabricate a flat optical waveguide. A He-Ne laser beam was introduced into that optical waveguide without a later-described oxi-nitride layer 33 to measure a near field pattern. The mode number measured was three. From the measurement of an interferometer microscope, moreover, it was revealed that the optical waveguide layer 32 had a refractive index of 2.236 for the refractive index of 2.214 of the LiNbO$_3$ substrate and that the optical waveguide layer 32 had a thickness of 2.3 μm. On the optical waveguide thus fabricated, there was formed under the aforementioned sputtering condition the oxi-nitride layer 33 which had a thickness of 0.5 μm and its refractive index adjusted to 2.230. The near field pattern was observed by a method similar to the aforementioned one to confirm that the mode was single.

Generally speaking, the single mode condition of the optical waveguide is expressed by the following formula, if the refractive indexes of the substrate, the optical waveguide layer and the overlying clad layer are designated by $n_s$, $n_f$ and $n_c$, respectively, if the thickness of the waveguide layer is designated by h, and if the wavelength is designated by λ (wherein: $n_f > n_s$; and $n_f > n_c$):

$$\frac{1}{2\pi} \cdot \frac{1}{\sqrt{n_f^2 - n_s^2}} \tan^{-1}\{|n_s^2 - n_c^2|/(n_f^2 - n_s^2)\}^{\frac{1}{2}} < \frac{h}{\lambda} <$$

$$\frac{1}{2\pi} \cdot \frac{1}{\sqrt{n_f^2 - n_s^2}} (\tan^{-1}\{|n_s^2 - n_c^2|/(n_f^2 - n_s^2)\} + \pi).$$

In the case of the Ti-diffused LiNbO$_3$, since $n_s = 2.214$ and $n_f = 2.236$ and since $n_c = 1$ because the clad layer is air in the case of the ordinary fabrication process, the thickness of the optical waveguide layer has to be 1.5 μm or less for the single mode operation with λ = 0.633 μm. In order to ensure efficient coupling to another optical device such as a light source or optical fibers, however, it is desired that the optical waveguide layer be thick. For this purpose, it is derived at a glance from the above-specified formula that the refractive index of the clad layer be closer to the value of the optical waveguide layer. Because of absence of a suitable clad material in the prior art, however, it is substantially impossible to set the thickness of the optical waveguide layer at an arbitrary value within the range of the single mode operation. Despite of this fact, according to the present invention, an optical waveguide having its optical waveguide layer of a thickness of several microns so that it can be efficiently coupled to another optical device can be easily fabricated as not only one prepared on the LiNbO$_3$, but also one prepared by using another material.

As has been described hereinbefore, according to the present invention, it is possible to easily prepare an oxi-nitride layer which can have its refractive index suitably selected within a range from 1.458 to 2.230. By using the oxi-nitride layer, it is possible to fabricate by a simple process an optical waveguide which has such an arbitrary refractive index value and an arbitrary refractive index distribution as has hardly been available in the prior art. The degree of freedom of designing the optical waveguide is remarkably augmented according to the present invention.

What is claimed is:

1. A thin-film type optical waveguide comprising:
   a substrate; and
   a lower clad, a core and an upper clad provided on said substrate;
   wherein at least a portion of at least one of said lower clad, said core and said upper clad is an oxi-nitride layer made of silicon oxide and silicon nitride.

2. A thin-film type optical waveguide as set forth in claim 1, wherein at least said upper clad is an oxi-nitride layer made of silicon oxide and silicon nitride.

3. A thin-film type optical waveguide as set forth in claim 1, wherein each of at least said core and said upper clad is an oxi-nitride layer made of silicon oxide and silicon nitride.

4. A thin-film type optical waveguide as set forth in claim 1, wherein each of said lower clad, said core and said upper clad is an oxi-nitride layer made of silicon oxide and silicon nitride.

5. A thin-film type optical waveguide as set forth in claim 4, wherein said core is an oxi-nitride layer containing more nitrogen than each of said lower clad and said upper clad.

6. A thin-film type optical waveguide as set forth in claim 1, wherein said oxi-nitride layer has a nitrogen content having a graded distribution in a direction of thickness, the nitrogen content of said oxi-nitride layer being higher in an interior portion of said layer than at surfaces of said oxi-nitride layer and reaching a maximum at an interior portion of said oxi-nitride layer.

7. A thin-film type optical waveguide as set forth in claim 6, where in said oxi-nitride layer has a graded refractive index distribution in a direction of thickness, the refractive index of said oxi-nitride layer being higher in an interior portion of said layer than at surfaces of said oxi-nitride layer and reaching a maximum at an interor portion of said oxi-nitride layer.

8. A thin-film type optical waveguide as set forht in claim 2, wherein said upper clad is made of an oxi-nitride layer having a refractive index lower than a refractive index of said core.

9. A thin-film type optical waveguide as set forth in claim 3, wherein said core is made of an oxi-nitride layer having a refractive index higher than a refractive index of said lower clad, and said upper clad is made of an oxi-nitride layer having a refractive index lower than said index of refraction of said core.

10. A thin-film type optial waveguide as set forth in claim 1, wherein said lower clad is provided on said substrate, said core is provided on said lower clad and said upper clad is provided on said core.

11. A thin-film type optical waveguide as set forth in claim 8, wherein said substrate and lower clad are made of LiNbO$_3$ and said core is made of Ti-diffused LiNbO$_3$.

12. A thin-film type optical waveguide as set forth in claim 1, wherein said oxi-nitride layer has a refractive index in the range of 1.458 to 2.230.

13. A thin-film type optical waveguide as set forth in claim 1, wherein said oxi-nitride layer is formed by a sputtering method employing a Si target and using a sputtering gas containing $N_2$ and $O_2$ in a predetermined ratio.

14. A thin-film type optical waveguide as set forth in claim 1, wherein said core has a thickness of several microns.

15. A thin-film type optical waveguide as set forth in claim 1, wherein said core has a thickness of about 2.3 $\mu$m.

16. A thin-film type optical waveguide as set forth in claim 11, wherein said core has a thickness of several microns.

17. A thin-film type optical waveguide as set forth in claim 11, wherein said core has a thickness of about 2.3 $\mu$m.

* * * * *